United States Patent
Bertholdt et al.

(10) Patent No.: US 6,387,279 B1
(45) Date of Patent: May 14, 2002

(54) METHOD FOR REMOVING NITRATE IONS FROM A SOLUTION

(75) Inventors: Horst-Otto Bertholdt, Forchheim; Rainer Gassen, Fürth, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/699,970

(22) Filed: Oct. 30, 2000

Related U.S. Application Data

(63) Continuation of application No. PCT/DE99/01254, filed on Apr. 28, 1999.

(30) Foreign Application Priority Data

Apr. 30, 1998 (DE) .......................................... 198 19 518

(51) Int. Cl.$^7$ ............................. B01D 17/06; C02F 1/68
(52) U.S. Cl. ....................................... 210/749; 210/748
(58) Field of Search ........................ 422/24; 250/455.11, 250/504 R; 588/20; 210/22, 59, 748, 749; 423/251

(56) References Cited

U.S. PATENT DOCUMENTS

| | | | | |
|---|---|---|---|---|
| 3,617,546 A | * | 11/1971 | Li et al. ........................ | 210/22 |
| 3,673,086 A | * | 6/1972 | Drobnik ........................ | 210/59 |
| 3,862,296 A | * | 1/1975 | Dotson et al. .............. | 423/251 |
| RE30,125 E | * | 10/1979 | Li et al. ........................ | 210/22 |
| 5,848,363 A | * | 12/1998 | Guillermier et al. .......... | 588/20 |
| 5,997,812 A | * | 12/1999 | Burnham et al. ............. | 422/24 |

* cited by examiner

*Primary Examiner*—Jack Berman
*Assistant Examiner*—Johnnie L. Smith, II
(74) *Attorney, Agent, or Firm*—Herbert L. Lerner; Laurence A. Greenberg; Werner H. Stemer

(57) ABSTRACT

Nitrate ions are removed from a solution. Such a solution is, in particular, a spent decontamination solution or another spent solution intended for reducing the radioactivity of a metal part. It is provided that the solution, if it comprises a short-chain organic compound, is irradiated with UV light. Otherwise, such a compound is introduced into the solution prior to irradiation. Using the method, the nitrate ions are chemically reduced, forming, for example, $N_2$, $N_2O$, $CO_2$ and $H_2O$.

19 Claims, No Drawings

METHOD FOR REMOVING NITRATE IONS FROM A SOLUTION

CROSS-REFERENCE TO RELATED APPLICATION

This is a continuation of copending international application PCT/DE99/01254, filed Apr. 28, 1999, which designated the United States.

BACKGROUND OF THE INVENTION

Field of the Invention

The invention relates to a method for removing nitrate ions from a solution, in particular from a spent decontamination solution or from another spent solution for reducing radioactivity.

Nitrate ions are not desired in wastewaters. They are, however, present in various solutions which are to be disposed of as wastewater. For example, spent decontamination solution which has been used in a nuclear power station for decontaminating surfaces comprises nitrate ions. The same is true of a solution which has been used for other methods of reducing radioactivity. In such processes, nitric acid, for example, is used, which releases nitrate ions in the solution.

It has already been proposed to use anion exchanger resins to remove nitrate ions from a solution. Such a process is very cost-intensive and gives rise to nitrate-charged ion exchanger resins, which have to be disposed of. In some areas of the technology, e.g. in nuclear technology, the charging of ion exchanger resins with nitrate ions is undesired since it is feared that amines already present in the ion exchanger resin will react with the nitrate ions.

SUMMARY OF THE INVENTION

It is accordingly an object of the invention to provide a method for removing nitrate ions from a solution which does not require ion exchangers and completely removes even the smallest concentrations of nitrate.

With the foregoing and other objects in view there is provided according to the invention a method for removing nitrate ions from a solution comprising the steps of establishing whether the solution comprises a short-chain organic compound, and, if such a compound is present, irradiating the solution with UV light, and if such a compound is not present, introducing a short-chain organic compound into the solution, and then irradiating the solution with UV light.

The organic compound, which together with the UV light effects a reduction in the nitrate ions, can be present in the solution to be treated. This is because decontamination solutions or other solutions which are left behind when the radioactivity of metal parts is reduced, frequently comprise suitable short-chain organic compounds. Advantageously, therefore, if it has been established that a suitable compound is already present, such a compound does not have to be provided.

Where it has been established that the solution to be treated does not comprise a suitable organic compound, a short-chain organic compound is introduced into the solution.

Whether such desired short-chain organic compound is present in the solution or not can be established as a result of a measurement, an analysis of the solution or else by recapitulating the history of which substances have previously formed the solution.

Whether present in the solution to be treated as supplied or by being added thereto, the short-chain organic compound is present in an effective amount to achieve, under the influence of ultraviolet irradiation according to the invention, substantially complete removal of nitrate ion from the solution. Such effective amount is at least two moles per mole of nitrate ion present in the solution and can be greater, up to a practical upper limit governed by the need to use no more than necessary, as remaining levels of short-chain organic compound do not interfere with disposal of the treated solution in the manner desired.

Using the method according to the invention, the nitrate ions are chemically reduced to give, for example, such harmless substances as nitrogen ($N_2$), nitrous oxide ($N_2O$), carbon dioxide ($CO_2$) and water ($H_2O$).

Nitrate ion concentrations successfully reduced by the method according to the invention can range from 1 microgram per liter to 5000 milligrams per liter, preferably from 100 micrograms per liter to 100 milligrams per liter.

The method according to the invention has the advantage that no ion exchanger is needed to remove nitrate ions from a solution.

A suitable short-chain organic compound is, for example, an acid, in particular a short-chain carboxylic acid or a short-chain dicarboxylic acid. Preferred examples of such a suitable acid are ascorbic acid, tartronic acid, oxalic acid, glycolic acid, glyoxylic acid and/or formic acid. Formic acid is particularly preferred.

The acid used in the method according to the invention preferably has from one to six carbon atoms and a $pK_a$ not greater than 5, most preferably not greater than 4, $pK_a$ being an inverse measure of acid strength, i.e. the stronger the acid the lower the $pK_a$ value.

The solution which is to be freed from nitrate ions can be, for example, a spent solution which comprises nitrate ions resulting from nitric acid which has been added thereto, e.g. in the course of its intended use. Nitric acid can be used for reducing the radioactivity of a metal part and is then present in the solution which remains and which is to be disposed of.

As a result of the use of nitric acid in such solution and addition of short-chain organic acid thereto according to this invention, the pH of such solution can range from approximately 1.5 to approximately 6.5, preferably from 2.5 to 4.5.

Irradiation with UV light gives, e.g. from nitric acid and formic acid, the end products nitrous oxide, carbon dioxide and water. These substances may be evolved. The empirical formula is:

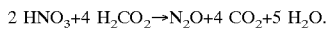

$$2\ HNO_3 + 4\ H_2CO_2 \rightarrow N_2O + 4\ CO_2 + 5\ H_2O.$$

This reaction proceeds under irradiation with UV light.

The solution is, for example, circulated past a UV source.

The solution can also be treated with a UV source, e.g. with a UV immersion lamp, in a reaction vessel.

The UV source can be a so-called UV burner. This ensures that energy is always sufficiently supplied by irradiation by UV light.

During the reaction, the solution can be maintained at a temperature between room temperature and 100° C. For example, a temperature between 60° C. and 100° C. is chosen as the treatment temperature, at which the reduction of the nitrate ions proceeds particularly favorably.

In particular, the method according to the invention has the advantage that nitrate ions can be largely completely removed from a solution in a simple manner without generating secondary waste requiring further disposal, such as ion exchanger resins. The method can be used particularly favorably for disposing of spent decontamination solutions or other spent solutions required for reducing the radioactivity of components of nuclear power stations.

We claim:

1. A method for removing nitrate ions from a spent decontamination solution to which nitric acid has been added, which comprises the steps of establishing whether the solution comprises a short-chain organic compound and, if such a compound is present, irradiating the solution with UV light; and if such a compound is not present, introducing a short-chain organic compound into the solution, and then irradiating the solution with UV light.

2. The method according to claim 1, wherein the short-chain organic compound is an acid.

3. The method according to claim 2, wherein the short-chain organic compound is a short-chain carboxylic acid or dicarboxylic acid.

4. The method according to claim 3, wherein the short-chain organic compound is formic acid.

5. The method according to claim 1, which comprises one of circulating the solution past a UV source and treating the solution with a UV source in a reaction vessel.

6. The method according to claim 1, wherein the solution during the reaction is maintained at a temperature between room temperature and 100° C.

7. The method according to claim 6, wherein the solution during the reaction is maintained at a temperature between 60° C. and 100° C.

8. A method for removing nitrate ions from a spent decontamination solution comprising the steps of establishing in the solution an effective amount of a short-chain organic compound, and irradiating the solution with UV light.

9. The method according to claim 8, wherein the short-chain organic compound is present in the solution as supplied.

10. The method according to claim 8, which comprises adding the short-chain organic compound to the solution prior to irradiation with UV light.

11. The method according to claim 8, wherein said short-chain organic compound is an acid.

12. The method according to claim 11, wherein said short-chain organic compound is a short-chain carboxylic acid or dicarboxylic acid.

13. The method according to claim 11, wherein said short-chain organic compound is selected from the group consisting of ascorbic acid, tartronic acid, oxalic acid, glycolic acid, and glyoxylic acid.

14. The method of claim 11, wherein said short-chain organic compound is formic acid.

15. The method according to claim 8, wherein said effective amount of short-chain organic compound is in the range of two to ten moles of said compound per mole of nitrate ion.

16. The method according to claim 8, wherein said solution is circulated past a UV source and/or is treated with a UV source in a reaction vessel.

17. The method according to claim 8, wherein said solution during the reaction is maintained at a temperature between room temperature and 100° C.

18. The method according to claim 17, wherein said solution during the reaction is maintained at a temperature between 60° C. and 100° C.

19. The method according to claim 8, wherein an amount of nitrate in the range from 1 microgram per liter to 5000 milligrams per liter is present in said solution as supplied.

* * * * *